United States Patent
Lehman et al.

[11] Patent Number: 5,884,717
[45] Date of Patent: Mar. 23, 1999

[54] TRICYCLE SWING ARM ASSEMBLY

[76] Inventors: John Lehman, P.O. Box 2193, Westlock, Alberta, Canada, T0G 2L0; Larry David Strilchuk, 4 Fieldstone Pl., Spruce Grove, Alberta, Canada, T7X 2Z4

[21] Appl. No.: 702,590
[22] PCT Filed: Feb. 21, 1995
[86] PCT No.: PCT/CA95/00118
  § 371 Date: Sep. 3, 1996
  § 102(e) Date: Sep. 3, 1996
[87] PCT Pub. No.: WO95/23727
  PCT Pub. Date: Sep. 8, 1995

[30] Foreign Application Priority Data

Mar. 4, 1994 [GB] United Kingdom .................... 2117011

[51] Int. Cl.$^6$ .................................................. B62K 13/04
[52] U.S. Cl. .......................... 180/209; 180/217; 280/284; 280/288
[58] Field of Search ................... 180/209, 210, 180/215, 217; 280/284, 285, 288, 282

[56] References Cited

U.S. PATENT DOCUMENTS

| | | | |
|---|---|---|---|
| 702,992 | 6/1902 | Pecor | 280/288 |
| 4,287,960 | 9/1981 | McConnell . | |
| 4,325,449 | 4/1982 | D'Addio et al. . | |
| 4,449,602 | 5/1984 | Dittmann, Jr. | 180/215 |
| 4,540,062 | 9/1985 | Kashiwai | 280/288 |
| 4,813,697 | 3/1989 | Takada | 280/284 |
| 4,877,102 | 10/1989 | Stewart | 180/217 |
| 5,529,141 | 6/1996 | Lehman et al. | 180/209 |
| 5,692,577 | 12/1997 | Dornbusch et al. | 180/209 |

FOREIGN PATENT DOCUMENTS 353842  5/1922  Germany .

*Primary Examiner*—Daniel G. DePumpo
*Attorney, Agent, or Firm*—Davis and Bujold

[57] ABSTRACT

A swing arm assembly (10) for use in converting a motorcycle into a tricycle is described which includes a rear axle assembly (12) and a swing arm (14) having a first end (16) and a second end (18). The first end (16) is adapted for pivotal attachment to a motorcycle chassis. The swing arm (14) is detachably secured to the rear axle assembly (12). A pair of axle engaging members (22) are secured in spaced relation to the rear axle assembly (12). A pair of telescopically extendable/retractable members (24) are provided having a first end (26) and a second end (28). The first end (26) of each telescopic member (24) is telescopically received in one of the axle engaging members (22). The second end (28) of each telescopic member (24) is attached to the second end (18) of the swing arm (14) after a continuous belt for a belt drive is slid loosely into position. The telescopic members (24) are telescopically extendable once the continuous belt is in position to place the belt in proper operating tension.

6 Claims, 3 Drawing Sheets

5,884,717

TRICYCLE SWING ARM ASSEMBLY

The present invention relates to a swing arm assembly for use in converting a motorcycle into a tricycle.

BACKGROUND OF THE INVENTION

The conversion of a motorcycle into a tricycle involves removing the single rear wheel of the motorcycle and replacing it with a rear axle assembly of the tricycle. The rear axle assembly is mounted to the motorcycle chassis by means of a pivotally mounted swing arm assembly.

Modern motorcycles are driven by a belt drive, which is considered as superior to a chain drive which the belt drive replaced as an industry standard. However, when a motorcycle having a belt drive is converted into a tricycle, the custom in the industry is to convert the drive system from a belt drive to a chain drive. Although this is acknowledged as a regressive step, it is generally considered unavoidable that this be done as the swing arm assembly prevents the installation of a continuous belt drive. In comparison the swing arm assembly does not prevent a chain drive from being installed as two of the interconnecting links of the chain can be separated to pass the chain around the barrier formed by the swing arm assembly.

The closest known prior art is U.S. Pat. No. 4,325,449 which issued to D'Addio et al in 1982 and U.S. Pat. No. 4,287,960 which issued to McConnell in 1981. The D'Addio reference is the primary reference which discloses a swing arm assembly that includes a rear axle assembly and a swing arm having a first end and a second end. The first end is adapted for attachment to a motorcycle chassis. The second end has attachment means. Means is provided for detachably securing second end of the swing arm to the rear axle assembly. The McConnell reference discloses an alignment mechanism which enables alignment to be adjusted by means of a bolt during the assembly of a conversion kit.

SUMMARY OF THE INVENTION

What is required is a swing arm assembly for use in converting a motorcycle into a tricycle that enables a continuous belt drive system to be maintained.

According to the present invention there is provided a swing arm assembly for use in converting a motorcycle into a tricycle which includes a rear axle assembly and a swing arm having a first end and a second end. The first end is adapted for pivotal attachment to a motorcycle chassis. The second end has attachment means. Means is provided for detachably securing the swing arm to the rear axle assembly which includes the following components. A pair of axle engaging members are secured in spaced relation to the rear axle assembly. A pair of telescopically extendable/retractable members are provided having a first end and a second end. The first end of each telescopic member is telescopically received in one of the axle engaging members. The second end of each telescopic member has attachment means compatible with the attachment means on the swing arm whereby the swing arm is attached to the telescopic member after a continuous belt for a belt drive is slid loosely into position. Means is provided for telescopically extending the telescopic member once the continuous belt is in position thereby placing the belt in proper operating tension.

The swing arm assembly as described is particularly adapted to enable the motorcycle to be converted into a tricycle while maintaining a continuous belt drive system.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
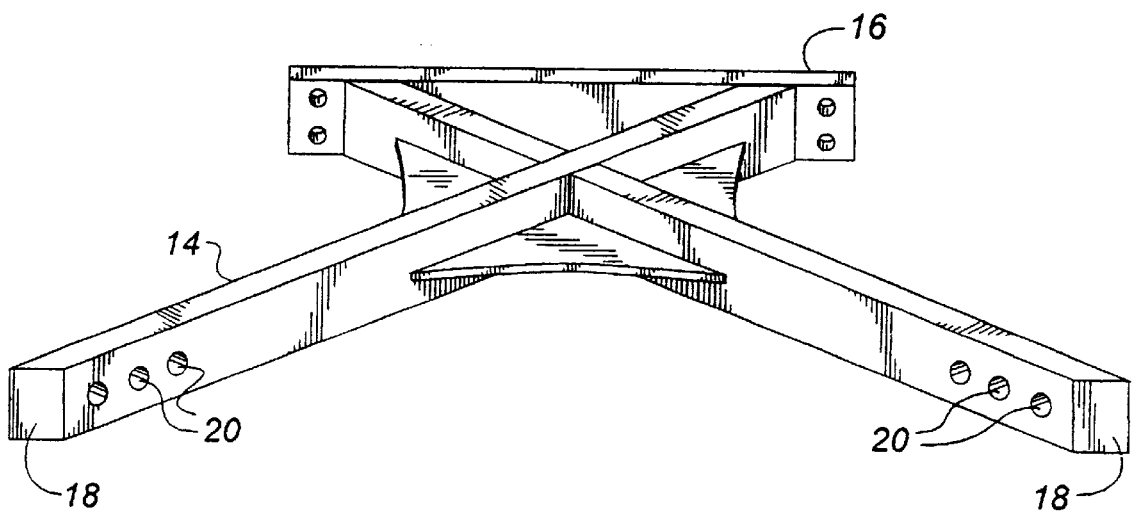
FIG. 1 is a perspective view of a swing arm.
Figure 3:
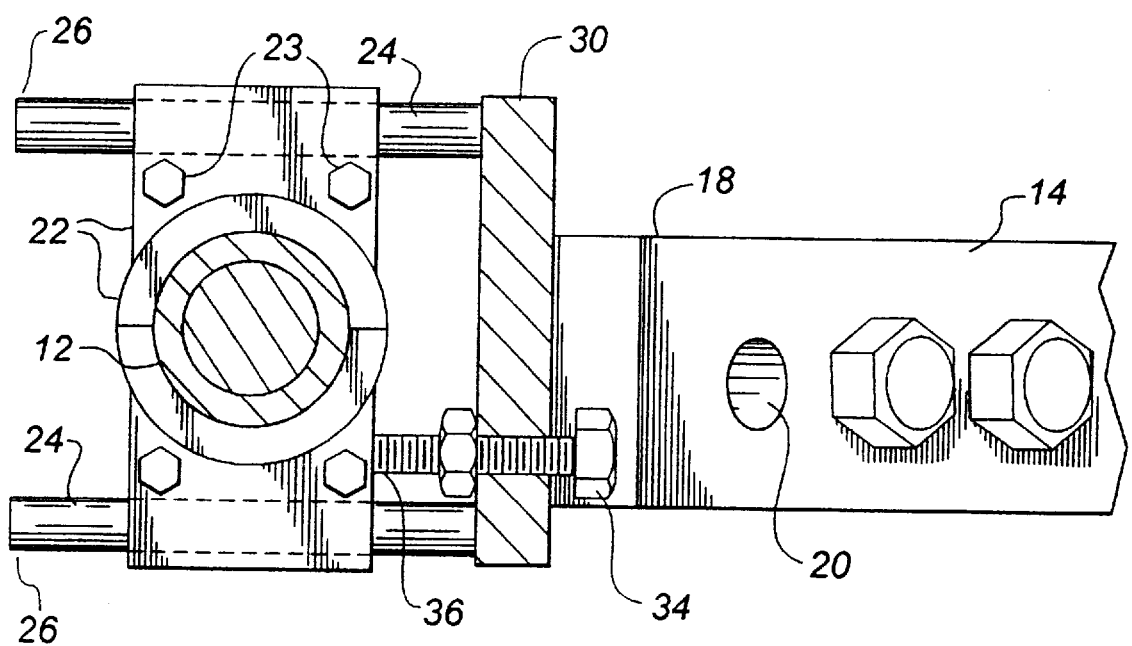
FIG. 3 is a side elevation view of the swing arm illustrated in FIG. 2.

The preferred embodiment, a swing arm assembly for use in converting a motorcycle into a tricycle generally identified by reference numeral 10, will now be described with reference to FIGS. 1 and 3.

Figure 2:
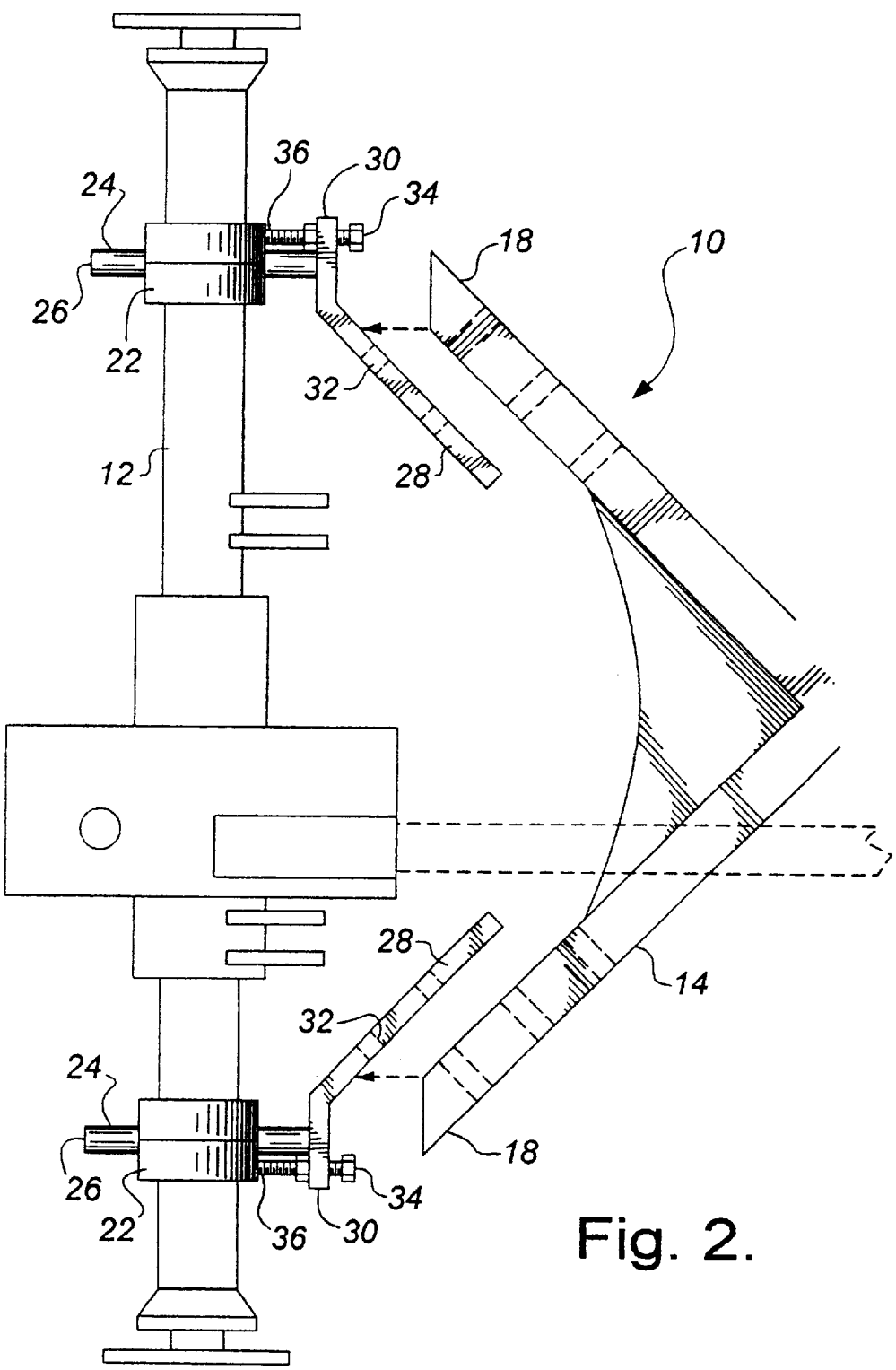
FIG. 2 is a top plan view of a swing arm assembly constructed in accordance with the teachings of the present invention.

Referring to FIG. 2, a rear axle assembly is identified by reference numeral 12. Referring to FIG. 1, a generally "X" shaped swing arm is identified by reference numeral 14. Swing arm 14 is a replacement for the swing arm provided by the manufacturer. Swing arm 14 has a first end 16 and a second end 18. First end 16 is adapted for pivotal attachment to a motorcycle chassis (not shown) Second end 18 has apertures 20 adapted to receive bolts (not shown). Referring to FIG. 2, swing arm 14 is detachably secured to rear axle assembly 12. A pair of axle engaging clamping members 22 are secured in spaced relation to rear axle assembly 12. Each of axle engaging clamping members 22 has a telescopically extendable/retractable member 24. Each telescopic member 24 has a first end 26, a second end 28, and a flange 30 projecting intermediate first end 26 and second end 28. First end 26 of each telescopic member 24 is telescopically received in a receiving channel (not shown) in one of axle engaging members 22. Referring to FIG. 3, it can be seen how axle engaging clamping members 22 clamp telescopically extendable/retractable member 24 in a selected telescopic position and are secured in place by means of bolts 23. Referring to FIG. 2, second end 28 of each telescopic member 24 has apertures 32 adapted to receive bolts (not shown). After a continuous belt (shown in outline form) for a belt drive is slid loosely into position apertures 32 on second end 28 of telescopic member 24 are aligned with apertures 20 on swing arm 14 and bolts inserted and maintained in position by nuts to attach swing arm 14 to telescopic member 24. It is to be noted that second end 28 of telescopic member 24 is inwardly angled to accommodate the "X" shape of swing arm 14. An adjustment screw 34 extends through flange 30 of telescopic member 24. Screw 34 has an end 36 that bears against axle engaging member 22. By rotating screw 34 a force is exerted upon telescopic member 24 and axle engaging member 22 to telescopically extend telescopic member 24 relative to axle engaging member 22. This allows the continuous belt of the belt drive to be placed in proper operating tension.

The embodiments of the invention in which an exclusive property or privilege is claimed are defined as follows:

1. A swing arm assembly (10) for use in converting a motorcycle into a tricycle, said swing arm assembly (10) comprising:

a swing arm (14) that is generally "X" shaped having a first end (16) and a second end (18);

means for detachably securing the second end (18) of the swing arm (14) to a rear axle assembly (12), and the rear axle assembly (12) comprising:

a pair of axle engaging members (22) adapted to be secured in spaced relation to the rear axle assembly (12);

a pair of telescopically extendable/retractable members (24) each having a first end (26) and a second end (28), the second end (28) of the telescopic member (24) being inwardly angled whereby the second end (28) of the telescopic member (24) accommodates the "X" shape of the swing arm (14), the first end (26) of each telescopic member being telescopically received in one of the axle engaging members (22), the second end (28) of each telescopic member (24) having a first attachment means (32) compatible with a second attachment means (20) at the second end (18) of the swing arm (14) whereby the swing arm (14) is attached to the telescopic member (24); and means (34) for telescopically extending the telescopic member (24).

2. The swing arm assembly (10) as defined in claim 1, wherein the second attachment means are apertures (20) through which bolts are inserted, and the bolts being maintained in position by nuts.

3. The swing arm assembly (10) as defined in claim 1, wherein the means for telescopically extending the telescopic member (24) is a screw adjustment (34).

4. The swing arm assembly (10) as defined in claim 1, wherein the axle engaging members (22) are clamping members that clamp around the axle.

5. The swing arm assembly (10) as defined in claim 4, wherein the first end (26) of each telescopic member (24) is telescopically received and clamped within one of the axle engaging clamping members (22), the second end (28) of each telescopic member (24) has telescopic member apertures (32) aligned with swing arm apertures (20) at the second end (18) of the swing arm (14) and bolts are inserted through said aligning apertures, and said bolts are secured by nuts to attach the swing arm (14) to the telescopic member (24).

6. The swing arm assembly (10) as defined in claim 4, wherein a flange (30) projects intermediate the first end (26) and the second end (28) of the telescopic member, an adjustment screw (34) extending through the flange (30) of the telescopic member (24), the screw (34) has an end (36) that bears against the axle engaging clamping member (22), such that by loosening axle engaging clamping member (22) and then rotating the screw (34) a force is exerted upon the telescopic member (24) to telescopically extend the telescopic member (24) relative to the axle engaging member (22).

* * * * *